United States Patent
Biancardi et al.

[15] 3,668,549
[45] June 6, 1972

[54] EXTENDED CLOSED CYCLE GAS LASER SYSTEM

[72] Inventors: Frank R. Biancardi, Vernon, Conn.; Gorken Melikian, Springfield, Mass.

[73] Assignee: United Aircraft Corporation, East Hartford, Conn.

[22] Filed: Sept. 10, 1969

[21] Appl. No.: 857,646

[52] U.S. Cl. ...........................................................331/94.5
[51] Int. Cl. ............................................................H01s 3/04
[58] Field of Search ...................331/94.5; 165/111; 62/514; 55/256, 263, 266; 330/4.3

[56] References Cited

UNITED STATES PATENTS

| | | | |
|---|---|---|---|
| 2,838,135 | 6/1958 | Pilo et al. | 55/94 |
| 3,020,138 | 2/1962 | Wethly | 55/94 |
| 3,191,916 | 6/1965 | Kurpit et al. | 55/94 |
| 3,391,281 | 7/1968 | Eerkens | 331/94.5 |
| 3,435,363 | 3/1969 | Patel | 330/4.3 |

*Primary Examiner*—Benjamin A. Borchelt
*Assistant Examiner*—N. Moskowitz
*Attorney*—Melvin Pearson Williams

[57] ABSTRACT

A flowing gas laser system is connected to a closed cycle, so that the gas effluent is reused, the gases being refrigerated to a temperature between 100° F and minus 40° F, or lower utilizing either heat exchange with a refrigeration cycle or gas expansion means, with or without additional pre-cooling utilizing ambient heat exchangers. Embodiments include premixed laser systems, and mixing type systems wherein the lasing gas is separated from other gases, in which case cooling to a point below ambient takes place after the separation.

21 Claims, 6 Drawing Figures

EXTENDED CLOSED CYCLE GAS LASER SYSTEM

BACKGROUND OF THE INVENTION

1. Field of Invention

This invention relates to gas lasers, and more particularly to closed cycle gas laser systems employing refrigeration of the laser input gases.

2. Description of the Prior Art

A variety of gas laser systems are known in the art. A number of systems employ an energizing gas and a lasing gas, the energizing gas receiving primary energy from some source, and transferring the energy to the lasing gas in such a fashion as to promote the emission of electromagnetic radiation from the lasing gas. High performance, high power systems have been operated from sources of stored high pressure liquified gas. However, this results in a high consumption of gas which becomes an extreme disadvantage in a number of proposed utilizations of various gas lasers. Therefore, to provide useful configurations of high performance laser systems the gases must be recycled to their original state.

SUMMARY OF INVENTION

The object of the present invention is to provide improved gas laser systems which are capable of operating in closed cycle configuration.

According to the present invention, gas laser systems capable of maximum power output and gain are provided in closed cycle configurations employing refrigeration of the gaseous inputs to the laser. In further accord with the present invention, laser configurations employing a mixing of a plurality of separately introduced gases may include refrigeration of either or both of said gases, or refrigeration may be applied to a mixture of gases. In accordance still further with the present invention, the refrigeration may be supplied in a gas cycle, utilizing a reverse Brayton cycle, employing the laser gases as the refrigerant. In another embodiment, a separate refrigeration cycle cools the laser gases through heat exchange therewith. In further accord with the present invention, the refrigeration cycle may be energized by the exhaust heat of the system prime mover or any other energy source.

The present invention relates to the discovery that operation of laser systems known to the prior art which rely on sources of high pressure liquified gas (such as nitrogen and carbon dioxide) actually rely in large measure, for high performance, upon the resulting low temperature of the gases supplied to the laser from storage tanks of high pressure, low enthalpy liquified gas. It has been discovered, that the connection of gas lasers in closed cycle systems results in significant degradation of performance due to the higher temperature of input gases supplied to the laser. The present invention overcomes this deficiency of closed cycle systems by providing for the refrigeration of gases supplied to the laser, in the closed cycle system, so that the temperature of the input gases is low.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
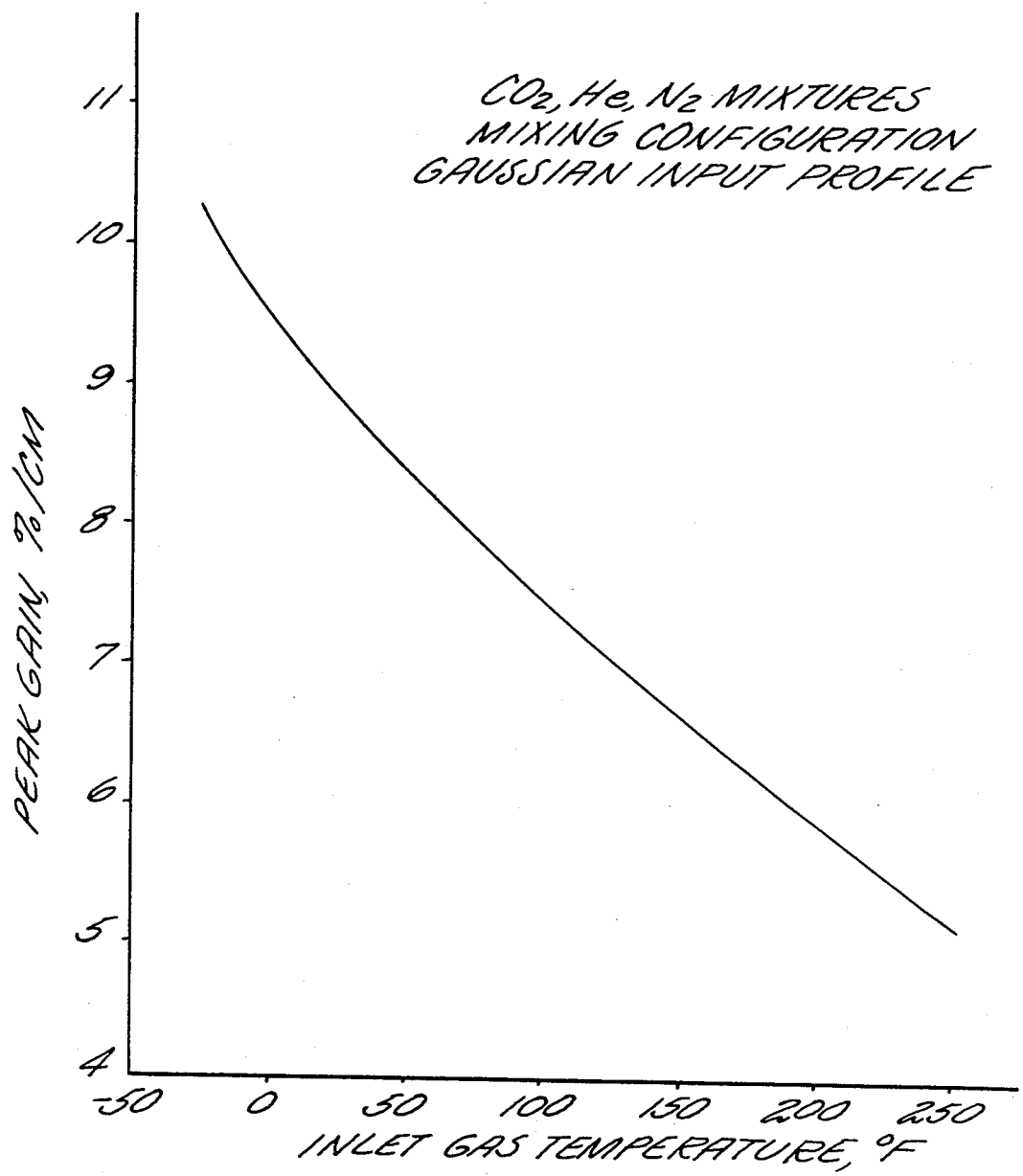
FIG. 1 is an illustration of peak gain as a function of inlet gas temperature, in accordance with the present invention.
Figure 2:
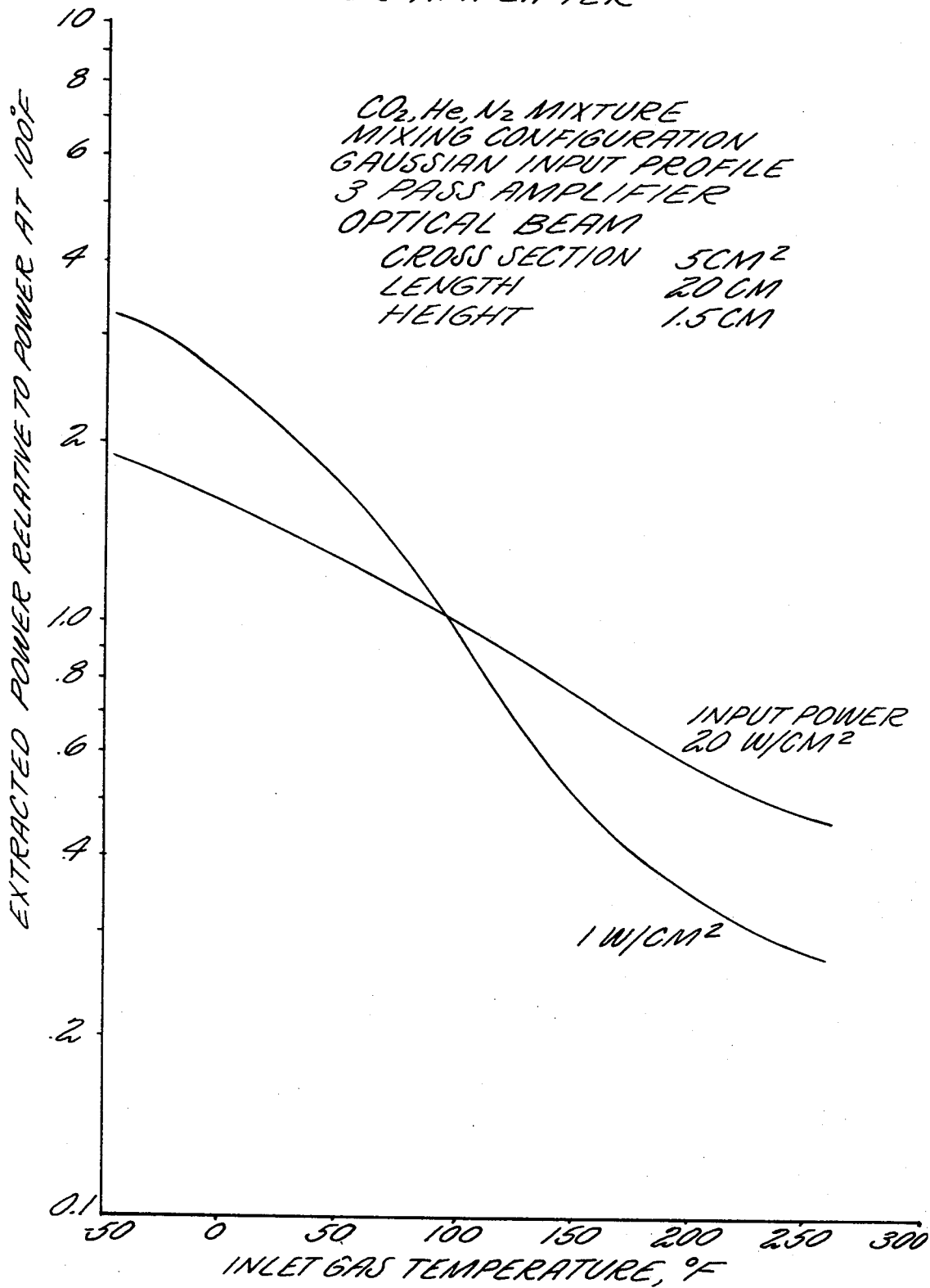
FIG. 2 is an illustration of maximum extractable power as a function of inlet gas temperature in accordance with the present invention.

The invention is predicated on the discovery that the theoretical maximum gain and power which can be extracted from the optical beam area of a laser is a function of the temperature of the chamber inlet gases. This is due primarily to the necessity of keeping the population of various low level energy states of the lasing gas sufficiently small so as to maintain a suitable population inversion, even at high powers, wherein the rate of transfer of upper laser levels to lower levels is high because of a high rate of photon emission. As seen in FIG. 1, the peak gain is doubled by lowering the temperature from approximately 250° F to approximately −25° F. Thus, the gain characteristic of the laser is significantly effected by the laser gas inlet temperature. Further, FIG. 2 illustrates the maximum power extractable in a practical amplifier configuration is fully commensurate with gain. The power characteristics illustrated in FIG. 2 are those for an exemplary system (which may take the form of the embodiment illustrated in FIGS. 5 or 6 herein), wherein mixing of the gases is achieved in the laser chamber, they being introduced separately. Although the data illustrated in FIG. 2 relates to a particular configuration with a given set of parameters, it serves to demonstrate the relationship of extractable power to temperature insofar as the teachings of the present invention are concerned. Different systems than the one relating to the data illustrated in FIG. 2 have a similar relationship between maximum extractable power and gas inlet temperature.

The present invention may be embodied in a variety of configurations wherein a flowing gas laser, of the mixing or premixing type, capable of high power operation, is operated in a closed cycle configuration so that one or more of the mixture of effluent gases are reused in the laser chamber, over and over. The important aspect is the provision of refrigeration of at least one of the gases, or of a mixture of a plurality of gases used in the laser prior to the introduction thereof to an inlet of the laser. The refrigeration in accordance with the present invention amounts to extracting all waste heat generated within the laser at a temperature which is significantly below temperatures achievable through heat exchange with ambient coolants, such as below 100° F. For illustrative purposes, the exemplary embodiments herein assume use of $CO_2$ as a lasing gas, and nitrogen, mixed with a relaxant such as Helium, as an energizing gas.

Figure 3:
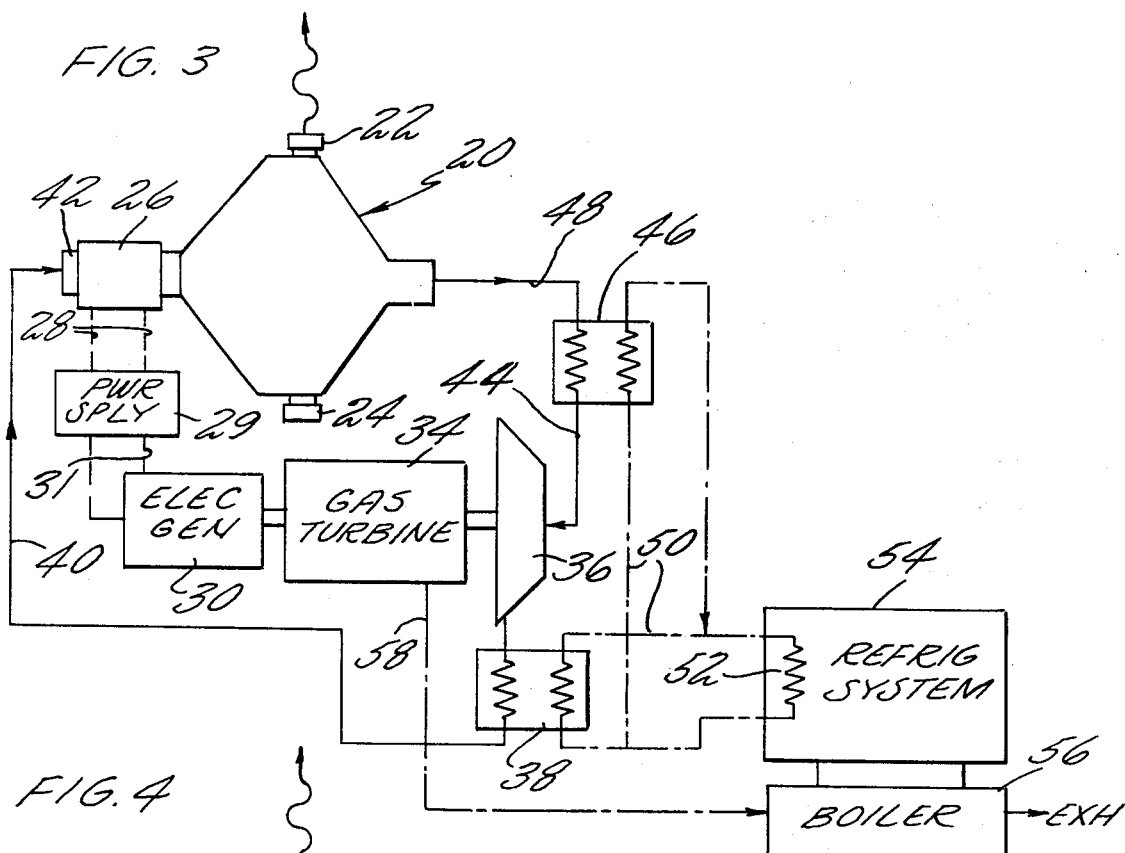
FIGS. 3–6 are simplified schematic illustrations of typical exemplary embodiments of the present invention.

Referring now to FIG. 3 a closed cycle gas laser of the premixing type includes a laser chamber 20 having an optical gain path including a pair or mirrors 22, 24 which receives a flow of a mixture of gases including at least an energizing gas from an excitation means comprising a DC electric discharge plasma 26, which is fed electrical power over a plurality of wires 28 from a power supply 29 that is excited by an electric generator 30 connected thereto by a plurality of wires 31. The electric generator 30 is in turn driven by a gas turbine 34 or other prime mover. The gas turbine 34 also drives a compressor 36 utilized to maintain a circulating flow of gases through the system. The output flow of the compressor 36 is passed through a heat exchanger 38 over a conduit 40 to an inlet 42 of the laser. The inlet to the compressor 36 is connected by a conduit 44 to a heat exchanger 46 which receives flow over a conduit 48 which comprises the effluent gases from the laser 20. The heat exchangers 38, 46 are connected by a conduit system 50 to a heat exchanging element 52 of a refrigeration system 54, within which the coolant which flows through the conduit system 50 is brought to a relatively low temperature, in the range of from about plus 100° to about minus 60° F, as suits the particular design implementation of the invention. The refrigeration system 54 may take the form of a conventional vapor cycle refrigeration system which may include a compressor driven by any one of several means, such as an electric motor, or it may employ a turbine driven by vapors from a waste heat energized boiler 56, heat being supplied thereto from the exhaust outflow 58 of the gas turbine or other prime mover 34. Any other form of refrigeration system such as an absorption cycle refrigeration system of the type heretofore known in gas-operated home refrigerators, or typical heat energized absorption refrigeration systems may be used. Additionally, the refrigeration system 54 may in fact take the form of a plurality of systems cascaded so as to achieve lower temperatures.

The heat exchanger 46 is positioned upstream of the compressor 36 in order to lower the temperature of the effluent gases in the conduit 44 at the inlet to the compressor 36 thereby permitting a decrease in the size of the compressor and the amount of power required by the prime mover (such as gas turbine 34) in order to drive the compressor to provide adequate flow of laser gases in the system. The heat exchanger 38, on the other hand, removes the heat of compression from the flow of gases prior to passing it along the conduit 40 for introduction into the laser at the inlet 42. Substantially, therefore, all of the waste heat put into the gases in the operation of the laser (due to inherent quantum efficiency and other inefficiencies of the laser) is removed in the heat exchanger 46; on the other hand, the heat put into the gases as it is compressed in the compressor 36 is removed by the heat exchanger 38, thus restoring the gases to the original inlet temperature. It should be noted that utilization of the refrigeration system (50–56) permits cooling of the gases to temperatures below that which would be obtainable if ambient coolants were utilized in the heat exchangers 38, 46; alternatively stated, it permits removing all of the waste heat supplied to the system by compression and by the inefficiencies of the laser processes at a temperature which is sufficiently low to promote high power, high gain operation as described hereinbefore. It should be noted that a number of obvious configurations of the heat exchange coolant conduit system 50 may be implemented by those skilled in the art to take advantage of the particular parameters of any gas laser system in which the present invention is to be incorporated. Thus, FIG. 3 is an illustration of a separate refrigeration cycle which cools the laser gases through heat exchange therewith.

Figure 4:
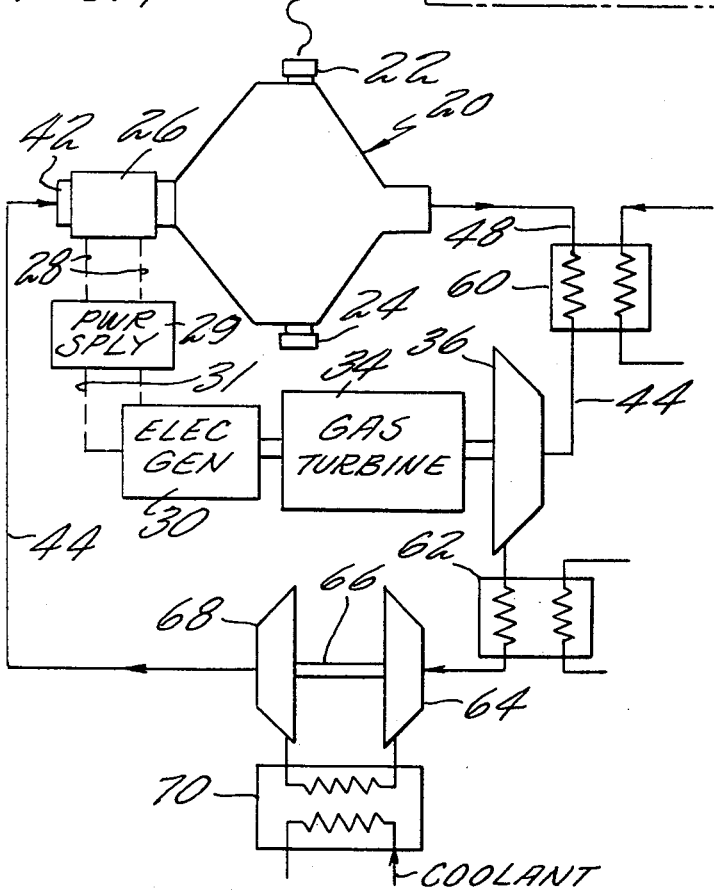

Another embodiment of the present invention, which employs an intrinsic refrigerating capability utilizing a cycle similar to a reverse Brayton cycle, employing the laser gases as a refrigerant, is illustrated in FIG. 4. Therein, the gas flow at the inlet of the compressor 36 in conduit 44 is cooled by a heat exchanger 60 which is supplied ambient coolant, as is a heat exchanger 62 at the outflow of the compressor. The difference between the heat exchangers 60, 62 in the embodiment of FIG. 4, and the heat exchangers 38 and 46 in the embodiment of FIG. 3 is that the heat removal takes place in these heat exchangers only to ambient coolant temperatures, which temperatures are not satisfactory for proper high power laser operation. In addition, the embodiment of FIG. 4 employs a compressor/cooler/expander configuration wherein the outflow from the heat exchanger 62 is compressed in a compressor 64 which is driven by a shaft 66 connected to an expander 68. The gas flows from the compressor 64 into a heat exchanger 70 where it is cooled, and then through the expander 68 which expands the gas. The energy extracted in the expansion process is utilized to drive the compressor 64. By compressing the flow in the compressor 64, it achieves a very high temperature, so that heat transfer with the ambient coolant is achieved in the heat exchanger 70. Thereafter, by expanding the gas flow, it can be dropped in temperature from ambient to a temperature significantly below ambient so as to be at a proper temperature for application at the inlet 42 of the gas laser, as described hereinbefore. Depending upon the mass flow, velocity and power requirements of a given gas laser system, it is possible that the compressor 64 and heat exchanger 70 may be removed, and the outflow of the heat exchanger 62 could be expanded to a temperature below ambient in the expander 68 directly. There are, of course, a number of other ways in which the reverse Brayton cycle, may be implemented or similar cycles of the type commonly referred to as air cycles, utilizing the laser gases as a refrigerant.

Figure 5:
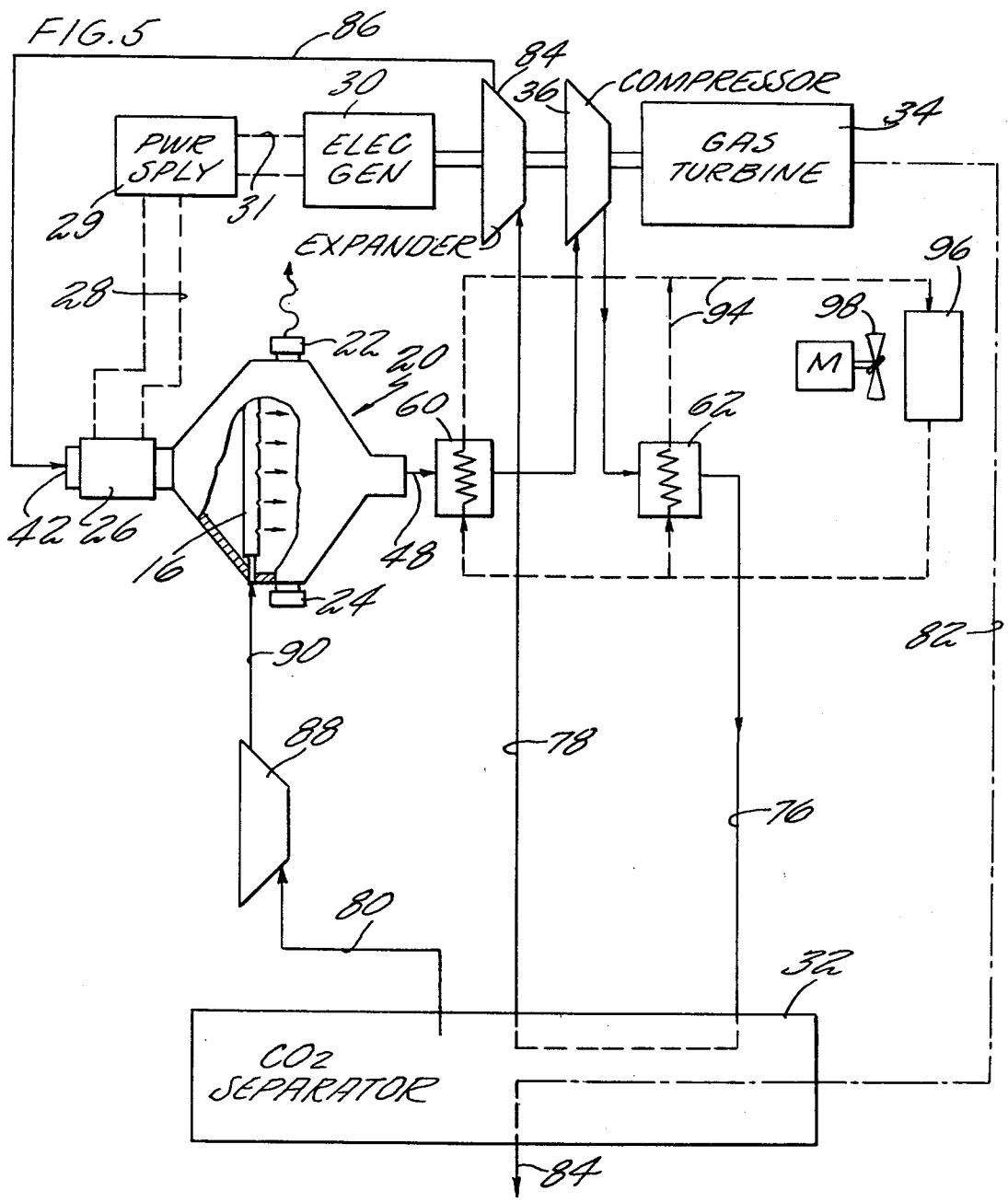
Figure 6:
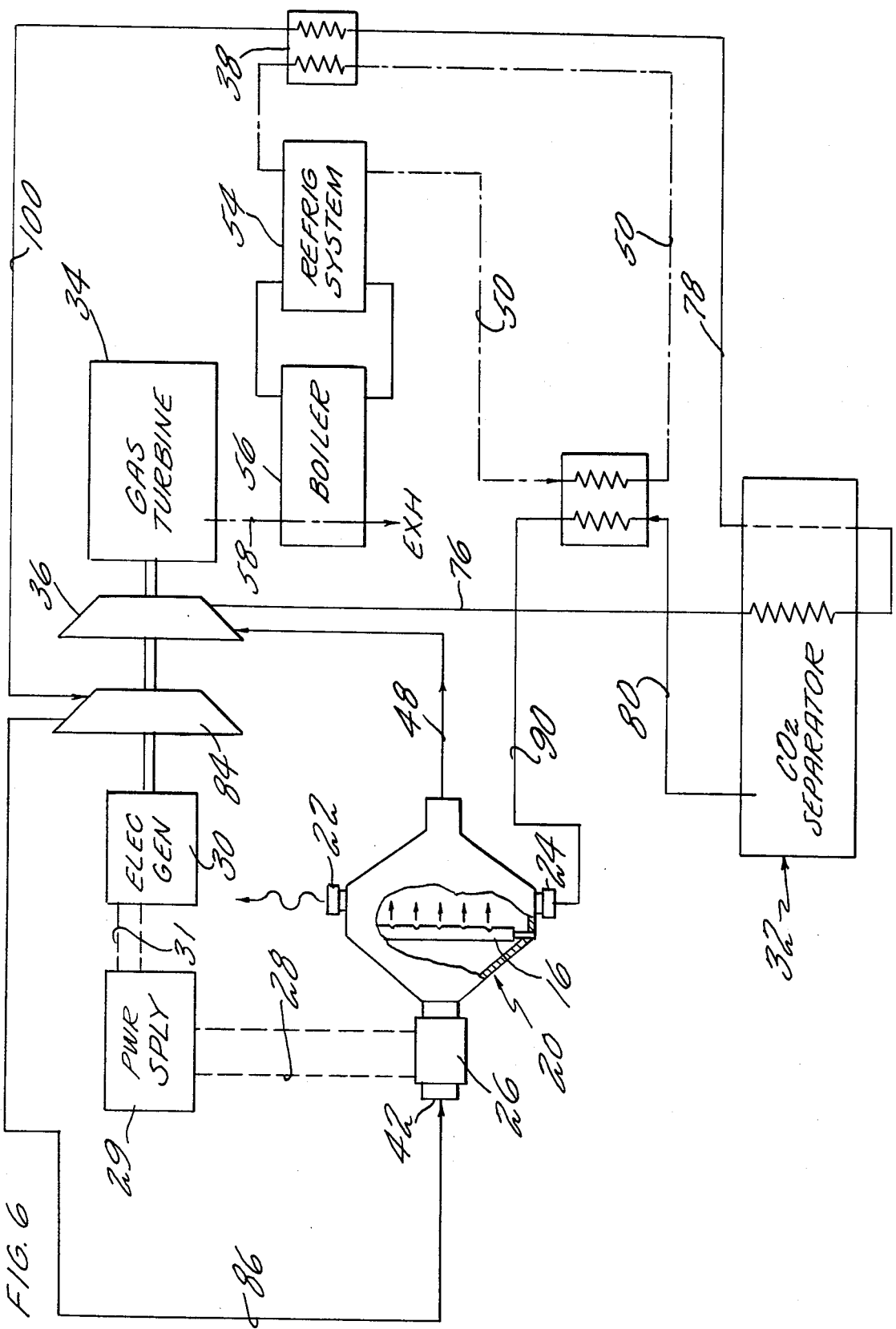

Embodiments of the invention which are employed in mixing gas laser configurations (wherein a plurality of gases are introduced separately into the laser) are illustrated in FIGS. 5 and 6. The embodiment of FIG. 5 differs from the simplified version of FIG. 4 last described (that is, utilizing the expander 68 directly in line at the outflow of the heat exchanger 62) only by the provision of a carbon dioxide separator 32 which separates carbon dioxide from the main stream of laser effluent gas in a conduit 76, so as to supply a gas stream without carbon dioxide in a conduit 78, and a gas stream of carbon dioxide in a conduit 80. The details of the carbon dioxide separator, and the significance of the closed cycle mixing configuration are fully disclosed in a copending application of the same assignee entitled CLOSED CYCLE GAS LASER SYSTEM, Ser. No. 858,565 filed by Melikian and Biancardi on even date herewith. The carbon dioxide separator receives heat, for the expulsion of $CO_2$ in a stripper, from the turbine exhaust supplied over a conduit 82 which is vented to ambient conditions (84). As described in the aforementioned copending application, the main flow of gases in a conduit 78 and the carbon dioxide in conduit 80 will be at roughly the same temperature (near ambient) as the flow in the conduit 76. The gases in conduit 78 are passed through an expander 84 before being passed through a conduit 86 to the inlet 42 of the main gas stream near the electric discharge 26 of the gas laser 20. Similarly, the carbon dioxide in a conduit 80 is passed through a free running expander 88 and then over a conduit 90 for injection into the laser chamber via a spray bar 16, as is described more fully in said copending application of Melikian and Biancardi. Thus, the embodiment of FIG. 5 illustrates practice of the present invention in the case where a separation of the gas stream is effected in order to permit operation of a gas laser in a mixing configuration, within which the lasing gas is introduced into an inlet separately from the energizing gas. The expander 84 may recover some work for driving the electric generator 30 and the compressor 36, thus reducing the power requirements of the gas turbine 34 (or other prime mover). On the other hand, the expander 84 could be a free running expander (not connected to the compressor 36 or generator 30) similar to the expander 88. The significant point is, the waste heat generated in the laser chamber 20 and added to the lases gases is extracted by ambient heat exchangers (60, 62) prior to expansion of the gas streams in conduits 78 and 80 forcing the temperature of each gas stream to a point significantly below ambient temperature, as described hereinbefore.

Another embodiment of the invention relating to the mixing configuration utilizing a refrigeration system is illustrated in FIG. 6. Therein, the gas laser effluent in conduit 48 is applied directly to the compressor 36, the output of which is applied over a conduit 76 to the $CO_2$ separator 32 where it may be first utilized in a heat exchanger within the stripper section so as to drive off carbon dioxide, and then passed into the absorber to have the $CO_2$ removed therefrom. This is as described in the aforementioned copending application of Melikian and Biancardi. From the $CO_2$ separator, the gas flow stripped of $CO_2$ is passed over a conduit 78 to a heat exchanger 38 which is in heat exchange relationship with a refrigeration system including conduits 50, as described with respect to FIG. 3 hereinbefore. It is then transferred over a conduit 100 to an expander 84, thence through a conduit 86 to the inlet 42 of the gas laser. The expander 84 is utilized in this case to lower the gas temperature as well as achieve a drop in pressure, since the $CO_2$ separator 32 requires much higher pressure than is required simply to circulate the gases in the system. However, the expander 84 may be a free wheeling expander, since having passed through the refrigeration heat exchanger 38, there is little work left in the gas as it enters the expander 84. As an alternative, an expansion valve may be utilized in place of the expander 84, but in most cases this would not permit reducing the temperature in the conduit 86 to as low a temperature as will the use of the expander 84.

Thus, the embodiments herein are illustrative of embodiments of the invention which permit closed cycle operation of gas lasers operating in either a premixed, or a mixing configuration, while providing cooling of the gases prior to reentry into the laser to temperatures from between 100° F and minus 40° F; this cooling may be provided by removing the excess heat generated in the laser through the use of ambient heat exchangers, together with additional cooling provided by means of a lower temperature coolant, thereby to keep the absolute temperature of the inlet gases sufficiently low to achieve high gain and high laser power output.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A closed cycle gas laser system comprising:
   a gas laser having a gas inlet means for receiving gases into said laser and a gas outlet means for discharging gases from said laser;
   gas flow means comprising a driven compressor and conduits for causing a flow of gases from said outlet means to said inlet means; and
   cooling means connected in series with said conduits of said gas flow means between the outflow of said compressor and the inlet means for cooling said gas flow to a temperature on the order of between minus 60° F and plus 100° F, said cooling means comprising a heat exchanger in heat exchange relationship with a closed cycle refrigeration system.

2. A closed cycle gas laser system comprising:
   a gas laser having a gas inlet means for receiving gases into said laser and a gas outlet means for discharging gases from said laser;
   gas flow means comprising a driven compressor and conduits for causing a flow of gases from said outlet means to said inlet means; and
   cooling means connected in series with said conduits of said gas flow means between the outflow of said compressor and said inlet means for cooling said gas flow to a temperature on the order of between minus 60° F and plus 100° F, said cooling means comprising gas expansion means located just upstream of said inlet.

3. A closed cycle gas laser system comprising:
   a gas laser having a gas inlet means for receiving gases into said laser and a gas outlet means for discharging gases from said laser, said inlet means comprising a first inlet for gases excluding lasing gas, and a second inlet for gases including at least the lasing gas;
   gas flow means comprising a driven compressor and conduits for causing a flow of gases from said outlet means to said inlet means;
   gas separating means connected in series with said conduit means downstream of said driven compressor for removing lasing gas from the gas effluent from the outlet of said laser, said separating means having a first outlet for gas excluding lasing gas and a second outlet for lasing gas; and
   cooling means connected in series with said conduits of said gas flow means between the outflow of said compressor and said inlet means for cooling said gas flow to a temperature of between minus 60° F and plus 100° F, said cooling means comprising a related cooling means in each of two gas flow paths from respective outlets of said gas separating means, one of said paths including conduits and a cooling means located between said first outlet and said first inlet and the other of said paths including conduits and a cooling means located between said second outlet and said second inlet.

4. The closed cycle gas laser system according to claim 3 wherein one of said related cooling means comprises gas expansion means located in the corresponding one of said gas flow paths.

5. The closed cycle gas laser system according to claim 3 wherein one of said related cooling means comprises a heat exchanger in heat exchange relationship with a closed cycle refrigeration system located in the related one of said gas flow paths.

6. A closed cycle gas laser system comprising:
   a gas laser having a gas inlet means for receiving gases into said laser and a gas outlet means for discharging gases from said laser;
   gas flow means comprising a driven compressor and conduits for causing a flow of gases from said outlet means to said inlet means; and
   cooling means connected in series with said conduits of said gas flow means between the outflow of said compressor and said inlet means for cooling said gas flow to a temperature on the order of between minus 60° F and plus 100° F, said cooling means comprising a heat exchanger in heat exchange relationship with a closed cycle refrigeration system, and a gas expander, said gas expander being located downstream of said heat exchanger.

7. The closed cycle gas laser system according to claim 3 wherein said one of said related cooling means comprises a heat exchanger in heat exchange relationship with a closed cycle refrigeration system, and a gas expander, said gas expander being located downstream of said heat exchanger.

8. The closed cycle gas laser system according to claim 4 wherein said one of said related cooling means comprises a heat exchanger in heat exchange relationship with a closed cycle refrigeration system, and a gas expander, said gas expander being located downstream of said heat exchanger.

9. The closed cycle gas laser system according to claim 5 wherein said one of said related cooling means comprises a heat exchanger in heat exchange relationship with a closed cycle refrigeration system, and a gas expander, said gas expander being located downstream of said heat exchanger.

10. A closed cycle gas laser system comprising:
    a gas laser having a gas inlet means for receiving gases into said laser and a gas outlet means for discharging gases from said laser;
    gas flow means comprising a driven compressor and conduits for causing a flow of gases from said outlet means to said inlet means; and
    cooling means connected in series with said conduits of said gas flow means between the outflow of said compressor and said inlet means for cooling said gas flow to a temperature on the order of between minus 60° F and plus 100° F, said gas flow means further comprising heat exchange means operative in response to ambient temperature coolant connected serially in said flow means between the outlet of said laser and said compressor for cooling said gas flow.

11. The closed cycle gas laser system according to claim 1 wherein said gas flow means further comprises heat exchange means operative in response to ambient temperature coolant connected serially in said flow means between the outlet of said laser and said compressor for cooling said gas flow.

12. The closed cycle gas laser system according to claim 2 wherein said gas flow means further comprises heat exchange means operative in response to ambient temperature coolant connected serially in said flow means between the outlet of said laser and said compressor for cooling said gas flow.

13. The closed cycle gas laser system according to claim 3 wherein said gas flow means further comprises heat exchange means operative in response to ambient temperature coolant connected serially in said flow means between the outlet of said laser and said compressor for cooling said gas flow.

14. The closed cycle gas laser system according to claim 4 wherein said gas flow means further comprises heat exchange means operative in response to ambient temperature coolant connected serially in said flow means between the outlet of said laser and said compressor for cooling said gas flow.

15. The closed cycle gas laser system according to claim 5 wherein said gas flow means further comprises heat exchange means operative in response to ambient temperature coolant connected serially in said flow means between the outlet of said laser and said compressor for cooling said gas flow.

16. A closed cycle gas laser system comprising:

a gas laser having a gas inlet means for receiving gases into said laser and a gas outlet means for discharging gases from said laser;

gas flow means comprising a driven compressor and conduits for causing a flow of gases from said outlet means to said inlet means; and cooling means connected in series with said conduits of said gas flow means between the outflow of said compressor and said inlet means for cooling said gas flow to a temperature on the order of between minus 60° F and plus 100° F, said cooling means further comprising heat exchange means responsive to ambient coolant connected serially in said flow means between said compressor and said inlet means for cooling said gas flow.

17. The closed cycle gas laser system according to claim 1 wherein said cooling means further comprises:

heat exchange means responsive to ambient coolant connected serially in said flow means between said compressor and said inlet means for cooling said gas flow.

18. The closed cycle gas laser system according to claim 2 wherein said cooling means further comprises:

heat exchange means responsive to ambient coolant connected serially in said flow means between said compressor and said inlet means for cooling said gas flow.

19. The closed cycle gas laser system according to claim 3 wherein said cooling means further comprises:

heat exchange means responsive to ambient coolant connected serially in said flow means between said compressor and said inlet means for cooling said gas flow.

20. The closed cycle gas laser system according to claim 4 wherein said cooling means further comprises:

heat exchange means responsive to ambient coolant connected serially in said flow means between said compressor and said inlet means for cooling said gas flow.

21. The closed cycle gas laser system according to claim 5 wherein said cooling means further comprises:

heat exchange means responsive to ambient coolant connected serially in said flow means between said compressor and said inlet means for cooling said gas flow.

* * * * *